United States Patent [19]
Sugai et al.

[11] Patent Number: 5,931,620
[45] Date of Patent: Aug. 3, 1999

[54] STRUCTURE WITH A RESIN EMBEDDED FASTENER COMPONENT

[75] Inventors: Chikafumi Sugai; Susumu Aoki, both of Kiryu, Japan

[73] Assignee: Mitsuba Corporation, Gunma, Japan

[21] Appl. No.: 09/005,881

[22] Filed: Jan. 12, 1998

[30] Foreign Application Priority Data

Jan. 24, 1997 [JP] Japan ..................... 9-026006

[51] Int. Cl.⁶ .................................................. F16B 39/02
[52] U.S. Cl. ............................................. 411/82; 411/180
[58] Field of Search ................................. 411/176, 178, 411/180, 258, 82, 546

[56] References Cited

U.S. PATENT DOCUMENTS

| D. 262,863 | 2/1982 | Barnsdale | 411/180 |
|---|---|---|---|
| 2,490,594 | 12/1949 | Madden | 411/180 |
| 3,461,936 | 8/1969 | Rosan, Sr. et al. | |
| 4,554,196 | 11/1985 | Meeker | 411/178 |
| 5,468,109 | 11/1995 | Ferrari | 411/180 |
| 5,697,744 | 12/1997 | Medal | 411/180 |

FOREIGN PATENT DOCUMENTS

| 0 182 472 | 5/1986 | European Pat. Off. | |
|---|---|---|---|
| 0 353 839 | 2/1990 | European Pat. Off. | |
| 48-20817 | 6/1973 | Japan . | |
| 51-157767 | 6/1975 | Japan . | |
| 63-3165 | 1/1988 | Japan . | |
| 5-13660 | 4/1993 | Japan . | |
| 778327 | 7/1957 | United Kingdom | 411/178 |
| 2221505 | 2/1990 | United Kingdom | 411/180 |

*Primary Examiner*—Flemming Saether
*Attorney, Agent, or Firm*—McCormick, Paulding & Huber

[57] ABSTRACT

In bottoms of three bolt head receiving holes 26 of a stay body 11 made of resin, there are embedded respective collars 30 by insert molding, in such a manner that both end surfaces of each collar are exposed. In an outer peripheral surface of the collar body 31, a knurled portion 32 is formed to leave a non-knurled portion 33 in a lower end portion of the collar body 31. The collar 30 is embedded in the stay body by insert molding in such a state that a slightly chamfered seating surface 34 of the non-knurled portion 33 is slightly projected from a lower end surface of the stay body 11. Since a resin adhered portion is not formed on the seating surface of the non-knurled portion of the collar, the seating surface of the collar and a fastening surface 27 of a bracket 8 is fastened by bolts 29 to be in tight contact with each other, and the stay 10 and the bracket 8 can be maintained in desired parallelism.

4 Claims, 5 Drawing Sheets

(a)

(b)

(a)

(b)

STRUCTURE WITH A RESIN EMBEDDED FASTENER COMPONENT

BACKGROUND OF THE INVENTION

1. Field of the Invention

The present invention relates to a first structure intended for fastened assembly to a second structure, and in particular to such a first structure in which a cylinder-shaped fastener component having a knurled portion in its outer peripheral surface is embedded in a resin-made main body of the structure by insert molding, the first structure for example being one used in making a motor to be mounted on a vehicle the first structure having a brush holder and being adapted for fixing to a bracket of the motor housing.

2. Related Art Statement

As a structure for fixing a brush holder unit to a bracket of a motor housing in a motor to be mounted on a vehicle, there is widely employed a fixing structure in which, a plurality of cylinder-shaped fasteners having respective knurled portions in their outer peripheral surfaces are embedded in a brush holder stay molded of resin by insert molding, and, while this fastener insert structure (i.e., the brush holder stay) is abutted against an end surface of the bracket, a bolt is inserted through each fastener to be screwed into the bracket so that the brush holder stay is screwed on the bracket. Generally, the outer peripheral surface of the fastener to be inserted into the product molded of resin is knurled so that the fastener can bite into the resin more firmly.

As examples disclosing the above-described type of conventional fastener insert structure, there may be listed Japanese Patent Publication No. 63-3165, Japanese Patent Publication No. 47-11009, Japanese UtilityModel Laid-Open No. 51-157767, Japanese Utility Model Publication No. 48-20817, and Japanese Utility Model Publication No. 5-13660.

For example, Japanese Utility model Publication 5-13660 discloses a fastener insert structure in which, by insert molding, a screw member is embedded in a mounting member for joining wiper arms, and discloses such wiper pivot mounting structure that a nut or bolt is screwed into the screw member through a car body panel while an abutting surface of the screw member is abutted against the car body panel.

However, in a brush holder stay having a plurality of fasteners which are embedded in the stay and have knurled portions in respective outer peripheral surfaces, there maybe a case that, at the time of molding, molding resin flows along knurled grooves to adhere to a fastener's end surface serving as a seating surface on a bracket. As a result, when a bolt is inserted through each fastener and screwed while each fastener's seating surface is abutted against the end surface of the bracket, there is fear that axial force of bolting is decreased because of deterioration of the resin by creep or the like. Further, in the case that a fastener is knurled in the whole outer peripheral surface, an end surface of the fastener tends to be deformed at the time of knurling, owing to plastic deformation of the material.

When the axial force of bolting is decreased, relative position between the brush holder stay and the motor bracket is changed, and accordingly, sliding contact between the brush and the commutator becomes unstable, and there is fear of arc etc.

An object of the present invention is to provide a fastener insert structure which can prevent adhesion of resin to a seating surface of a fastener.

SUMMARY OF THE INVENTION

The fastener insert structure according to the present invention comprises a cylinder-shaped fastener which has a knurled portion in its outer peripheral surface and is embedded in a main body made of resin by insert molding, and is characterized in that: the knurled portion is formed in such a manner that a non-knurled portion is left at least one end portion of the outer peripheral surface of the fastener, and a part of the non-knurled portion is projected from the main body.

According to thus-described construction, at the time of insert molding of the fastener to the main body of resin, molding resin which leaks from the end portion of the knurled portion is absorbed by the non-knurled portion and thereby prevented the resin from arriving at an end surface of the fastener as its seating surface. Further, since a part of the non-knurled portion is projected from the main body molded of resin, a fastener's end surface which becomes the seating surface is raised from a main surface of the main body on the side of the seating surface. Accordingly, it is possible to prevent more surely the phenomenon that the molding resin adheres to the seating surface of the fastener. Furthermore, since there exists the non-knurled portion at least on the side of the end surface which becomes the seating surface of the fastener, deformation of the end surface due to plastic deformation of the material is prevented at the time of knurling.

BRIEF DESCRIPTION OF THE DRAWINGS

FIG. 1(a) is a partially-omitted sectional front view, FIG. 1(b) is a partial enlarged sectional view, and FIG. 1(c) is a perspective view of a main component;

FIG. 5(a) is a perspective view of a main component, and FIG. 5(b) is a partial enlarged sectional view.

DESCRIPTION OF THE PREFERRED EMBODIMENTS

Figure 1:
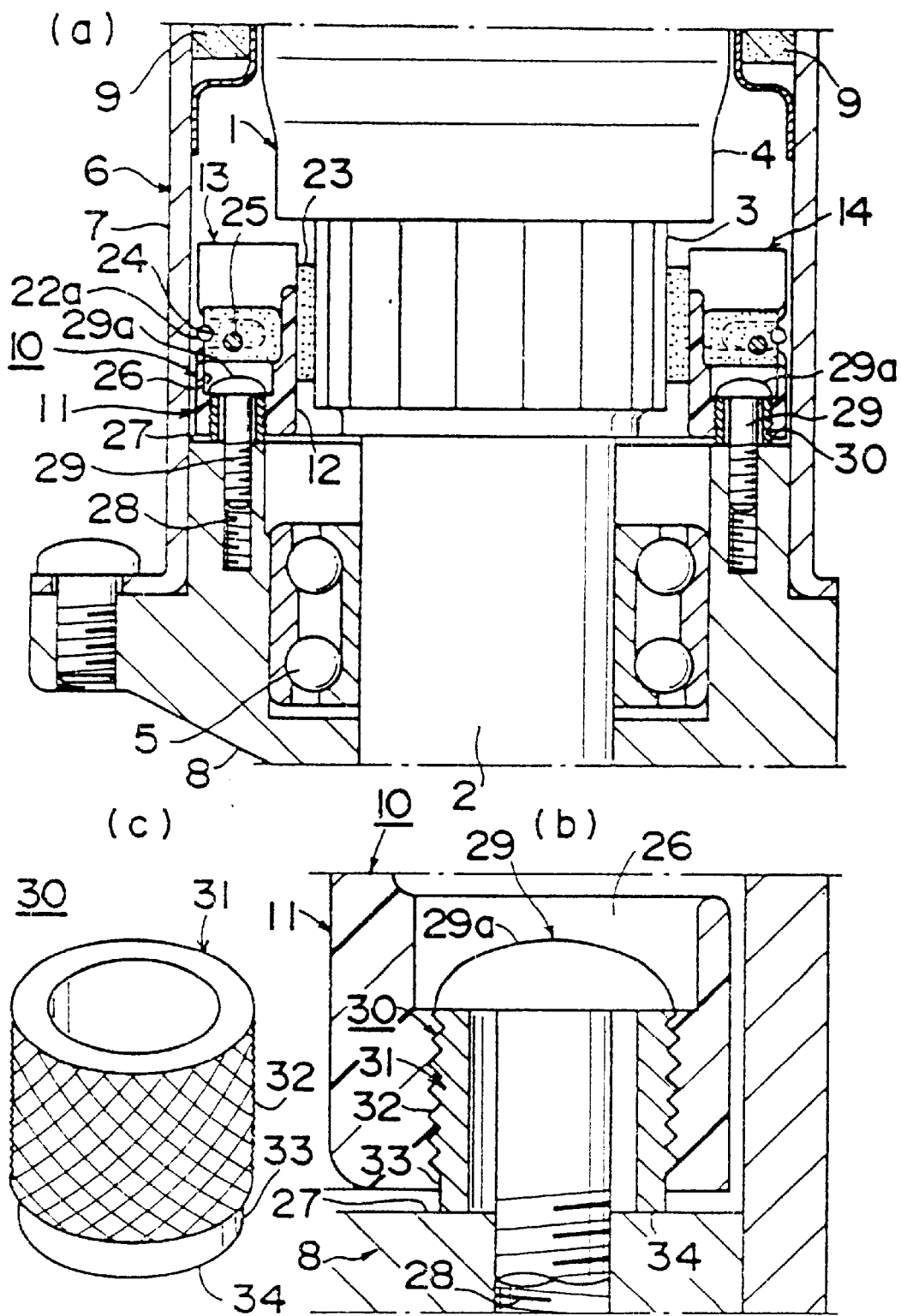
FIGS. 1(a)–1(c) are views showing mounting construction of a brush holder unit employing one embodiment of the fastener insert structure according to the present invention.
Figure 2:
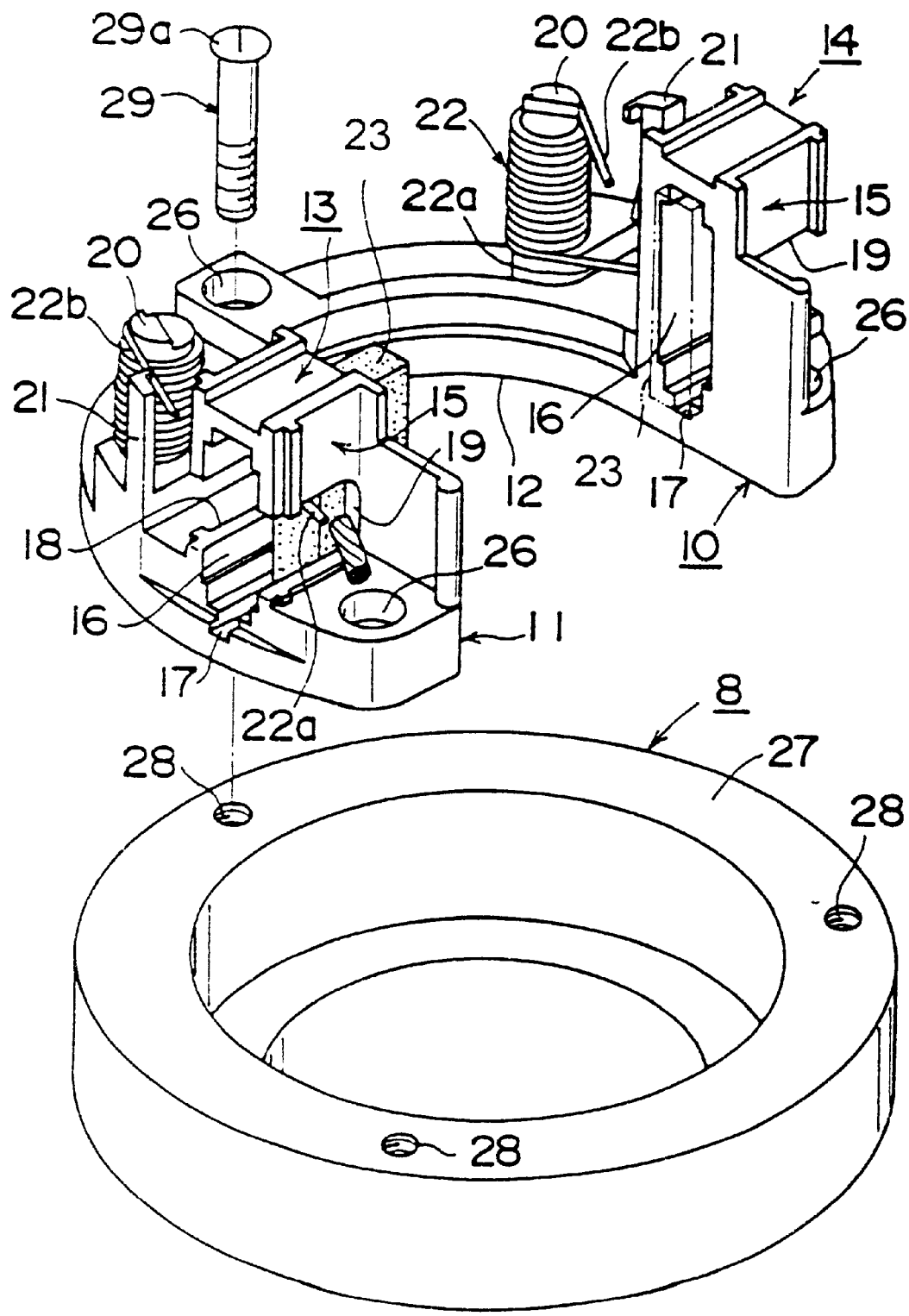
FIG. 2 is a partially-omitted perspective view of the mounting construction of FIG. 1.
Figure 3:
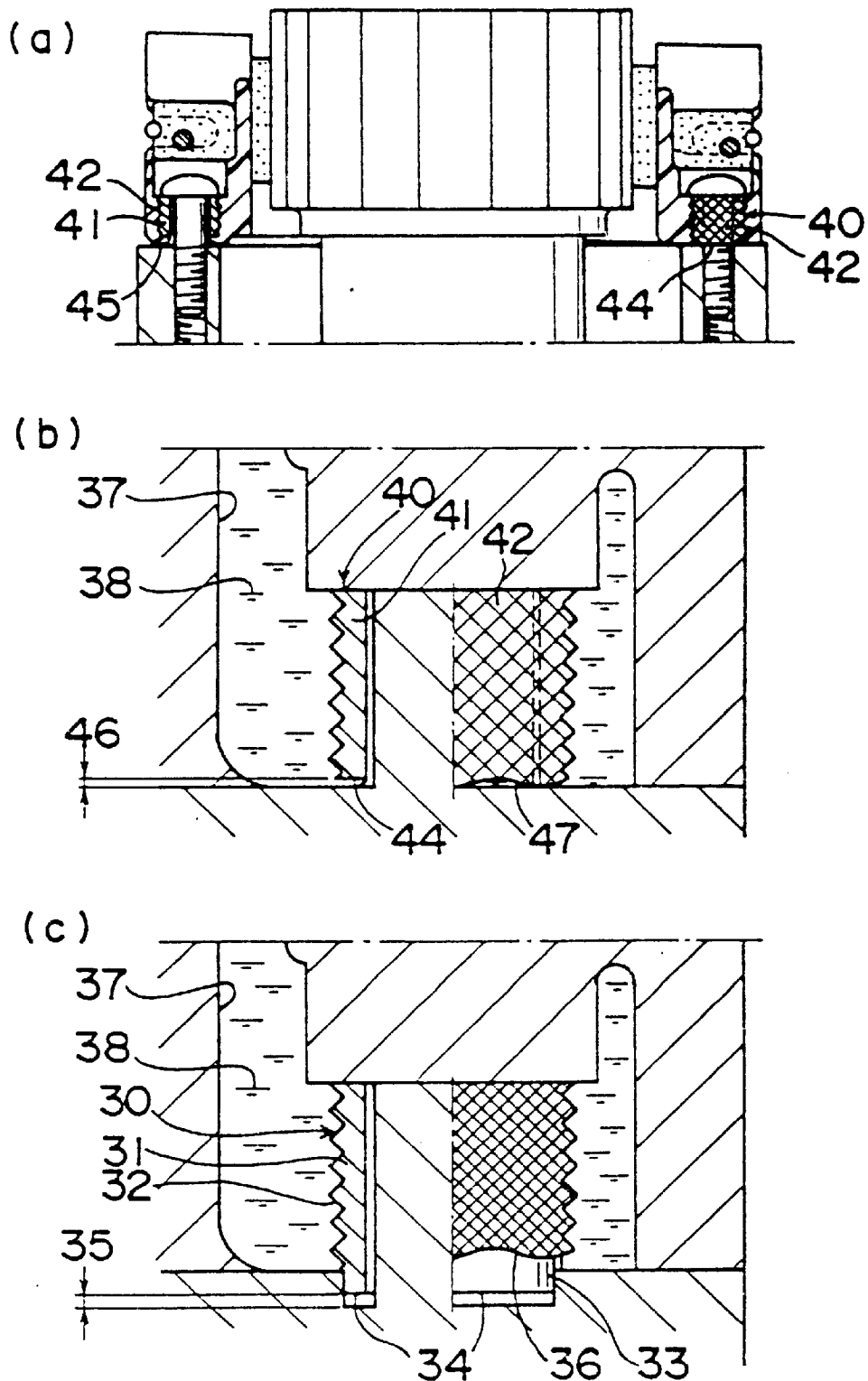
FIGS. 3(a)–3(c) are explanatory views explaining the operation.

FIGS. 1(a)–1(c) are views showing mounting construction of a brush holder unit employing one embodiment of the fastener insert structure according to the present invention: FIG. 1(a) is a partially-omitted sectional front view, FIG. 1(b) is a partial enlarged sectional view, and FIG. 1(c) is a perspective view of a main component; FIG. 2 is a partially-omitted perspective view of the mounting construction of FIG. 1; and FIGS. 3(a)–3(c) are explanatory views explaining the operation.

In the present embodiment, the fastener insert structure according to the present invention is constructed as a brush holder stay in the mounting construction of the brush holder unit for a motor to be mounted on a vehicle. The motor to be mounted on a vehicle (hereinafter, referred to as "motor") comprises an armature assembly, a motor housing, and a brush holder unit. The armature assembly 1 is constructed in such a manner that a commutator 3 and an armature 4 are assembled onto an outer periphery of a shaft 2 in its middle portion so as to rotate integrally. Both end portions of the shaft 2 are rotatably supported by a pair of ball-and-roller bearings 5, 5 (only one of them is shown). The motor housing 6 comprises a yoke 7 and a bracket 8, and the yoke 7 and the bracket 8 are connected by means of a flange joint in a socket-and-spigot manner. Onto an inner peripheral surface of a middle portion of the yoke 7, a plurality of magnets 9 are fixed, being positioned at regular intervals in the circumferential direction for constituting field poles. These magnets 9 are opposed to the armature 4 so as to relatively intersect the magnetic field.

Into the brush holder stay (hereinafter, referred to as "stay") 10 as one embodiment of the fastener insert structure according to the present invention, there is integrally assembled the brush holder unit. The stay 10 includes a stay body 11 as a main body made of resin. The stay body 11 is integrally formed in a generally U-shaped plate form. The outer shape of the stay body 11 is made to conform to the inner shape of the motor housing, and the inner shape of the stay defines a commutator insertion portion 12 conformed to the commutator 3.

On one end surface (hereinafter, referred to as "upper surface") of the stay body 11, a plus side brush holder 13 and a minus side brush holder 14 are integrally provided, being opposed to each other with the commutator insertion portion 12 between them, and projected upward in the vertical direction. The plus side brush holder 13 and the minus side brush holder 14 are formed in similar shapes arranged symmetrically to each other in relation to a center line bisecting the commutator insertion portion 12. Accordingly, in the following, only the construction of the plus side brush holder 13 will be described representatively.

The brush holder 13 has a holder body 15 formed generally in a shape of a rectangular cylinder. The holder body 15 is arranged to stand on the upper surface of the stay body 11 with its longitudinal sides of the rectangular cylinder being perpendicular to that upper surface, so that the cylinder axis is coincide with the normal of the commutator insertion portion 12. A brush housing 16 is defined by cylindrical inner surface of the holder body 15. The brush housing 16 is formed in such sizes that a brush described below can be slidably coupled into the brush housing in the direction of the cylinder axis (hereinafter, referred to as "in-out direction") to be held therein, and both inner and outer end surfaces of the brush housing 16 are opened. In a bottom surface inside the brush housing 16 of the holder body 15, a brush cooling groove 17 for preventing rise in brush temperature is recessedly provided so as to extend in the in-out direction with constant width and constant depth. Further, in side walls on both sides of the holder body 15, a cut-out portion 18 for a torsion spring and a cut-out portion 19 for drawing out a pigtail are integrally opened, respectively, so as to extend in the in-out direction. An outer end of each cut-out portion 18, 19 is opened in an outer end of the corresponding side wall.

On the upper surface of the stay body 11, a pair of torsion spring holding columns (hereinafter, referred to as "holding columns") 20, having the same columnar shape, are provided to project perpendicularly in sides of both brush holders 13, 14, respectively. A torsion spring 22 is held on each holding column 20, being mounted around the outside of the holding column 20. On the upper surface of the stay body 11, in positions adjacent to the holding columns 20, torsion spring stop columns (hereinafter, referred to "stop columns") 21 are provided to project perpendicularly, respectively. Each of the stop columns 21 receives and stops an end portion 22b on a reaction force side of the corresponding torsion spring 22.

A brush 23, which slides on the commutator 3, is received in the brush housing 16 of the brush holder, slidably in the in-out direction. The brush 23 is formed in such a manner that brush particles are tamped to form a shape of a generally rectangular flat table by means of a molding die, and then, sintered. In a back surface of the brush 23, a torsion spring engaging groove (hereinafter, referred to as "engaging groove") 24 for engaging with an action-side end portion 22a of the torsion spring 22 is recessedly provided to have a generally semicircular shape in section. The engaging groove 24 is engaged with an action-side end portion 22a of the torsion spring 22, and the torsion spring 22 biases the brush 23 toward the commutator 3 by its action-side end portion 22a, while the reaction-force-side end portion 22b of the torsion spring 22 is engaged with and received by the stop column 21. To the brush 23, a pigtail 25 is connected, at a shifted, i.e., offset position below from the engaging groove 24.

In the stay body 11 as the resin made main body of the fastener insert structure, there are recessedly provided three bolt head receiving holes 26 in a shape of circular hole having a constant inner diameter, being located at both end portions and central portion of the U-shape, respectively. In the bottom of each bolt head receiving hole, is embedded a collar 30 as a fastener by insert molding so as to expose both end surfaces of the collar 30. The locations of the three bolt head receiving holes 26 and collars 30 correspond respectively to three internally threaded holes 28 opened in an upper surface (hereinafter, referred to as "fastening surface") of the bracket 8 constituting a surface for fastening the stay 10 to the bracket 8. Into each of the internally threaded holes 28 of the bracket 8, a bolt 29 for fastening the stay 10 to the bracket is screwed. The bolts 29 are inserted through the collars 30 to be screwed into the internally threaded holes 28 respectively, so as to fasten the stay 10 to the bracket through the collars 30.

Each of the collar 30 includes a collar body 31 formed in a cylinder shape made of material having mechanical rigidity such as steel, and an inner diameter of the collar body 31 is set to be larger than an outer diameter of the thread of the bolt 29, and smaller than an outer diameter of the head 29a of the bolt 29. An outer diameter of the collar body 31 is set to be slightly smaller than the outer diameter of the head 29a of the bolt 29, and smaller than inner diameter of the bolt head receiving hole 26. In an outer peripheral surface of the collar body 31, a knurled portion 32 is formed to leave a non-knurled portion 33 in an end portion (hereinafter, referred to as "lower end portion") on the side of the bracket in that outer peripheral surface. The knurled portion 32 is formed in twill pattern and shaped by a rolling process. The non-knurled portion 33 is smaller than the knurled portion in diameter, and slight-chamfering is performed on an end surface of the non-knurled portion 33. Thus-constructed collar 30 is embedded in the bottom of the bolt head receiving hole 26 in such a manner that the slightly chamfered end surface (hereinafter, referred to as "seating surface") 34 of the non-knurled portion 33 is slightly projected from a lower end surface of the stay body 11, employing insert molding.

In a state that, as described above, three collars 30 are embedded in the stay body 11 in the same condition, the stay 10 is abutted against the fastening surface 27 of the bracket 8. At that time, the seating surfaces 34, i.e., end surfaces on the projected side of the collars 30 are opposed to the fastening surface 27 of the bracket, and the collars 30 are aligned to the internally threaded holes 28, respectively. Then, the bolts 29 are inserted through the collars 30, and screwed into the internally threaded holes 28, respectively. As a result, the collars 30 are fastened between the respective heads 29a of the bolts 29 and the fastening surface 27 of the bracket 8, so that the stay 10 or the stay body 11 in which the collars 30 are embedded by insert molding is in a state of being fixed to the bracket 8. Namely, the brush holder unit integral to the stay 10 is in a state of being fixed to the bracket 8. In this fixed state, it is ensured that each collar 30 and the fastening surface 27 are in tight contact with each other, being completely fastened by the bolt 29, so that the stay 10 or the brush holder unit and the bracket 8 are in a state that desired parallelism is maintained between them.

It is found by the present inventor that, in the case that, as shown in FIG. 3(a), a knurled portion 42 is formed in the whole outer peripheral surface of a body 41 of a collar 40, and the collar 40 is embedded in the stay body 11 by insert molding, in such a manner that both end surfaces of the collar 40 are exposed from the stay body 11, molding resin leaks to a seating surface 44 of the collar 40 opposed to the bracket, and a resin adhered portion 45 is formed. When the resin adhered portion 45 is formed on the seating surface 44 of the collar 40, there arise a state that the resin adhered portion exists between the seating surface 44 of the collar 40 and the fastening surface 27, and parallelism between the stay and the bracket is decreased. When the parallelism is decreased between the stay and the bracket, the brush holder built in the stay becomes inclined relative to the commutator, so that the brush holder may interfere with the commutator, or sliding resistance between the brush and the brush holder may be increased.

In this connection, the reason why the resin adhered portion 45 is formed on the seating surface 44 of the collar 40 is considered as follows. As shown in FIG. 3(b), when a gap 46 is generated between the seating surface 44 of the collar 40 and a cavity 37 of a molding die owing to dispersion in length of the collar body 41 in the axial direction, molding resin 38 leaks into this gap 46 to form a resin adhered portion 45. Further, in the case that the whole outer peripheral surface of the collar body 41 is knurled, a waving portion 47 is formed in the seating surface 44 of the collar 40 at the time of forming the knurled portion 42. Thereby, the molding resin 38 leaks into this waving portion 47 so that a resin adhered portion 45 is formed.

The present invention has been completed based on the above findings. Namely, in the above-described embodiment of the present invention, the knurled portion 32 is formed while the non-knurled portion 33 is left in the end portion of the outer peripheral surface on the side of the seating surface 34, and the seating surface 34 is made to project from the stay body 11. As a result, a resin adhered portion is not formed on the seating surface 34. Namely, as shown in FIG. 3(c), even when a gap 35 exists between the seating surface 34 of the collar 30 and the cavity 37 of the molding die owing to the dispersion in length of the collar body 31 in the axial direction, the molding resin 38 does not leak into this gap 35. As a result, a resin adhered portion of the leaked resin is not formed, inevitably. Further, even when a waving portion 36 is formed in the knurled portion 32 at the time of forming the knurled portion 32, the waving portion 36 on the side of the seating surface is formed only at the boundary to the non-knurled portion 33. Thereby, the molding resin 38 does not leak to the seating surface, and a resin adhered portion of leaked resin is not formed, inevitably.

As described above, since the non-knurled portion 33 is formed in the end portion of the outer peripheral surface of the collar body 31 on the seating side 34, and since the seating surface 34 is projected from the stay body 11, the stay 10 does not have a resin adhered portion on the seating surface 34. Accordingly, it is ensured that the seating surface 34 of each collar 30 and the fastening surface 27 are in tight contact with each other, being completely fastened by the bolt 29. Further, the seating surface 34 of each collar 30 is slightly chamfered, and accordingly, the seating surface 34 is flat and has high parallelism. Namely, the stay 10 and the bracket 8 maintain the desired parallelism, so that the brush holders 13, 14 built on the stay 10 can be surely kept perpendicular to the commutator 3. As a result, such a phenomenon is prevented that the brush holder 13, 14 interfere with the commutator 3, or sliding resistance of the brushes against the brush holders 13, 14 is increased.

Figure 4:
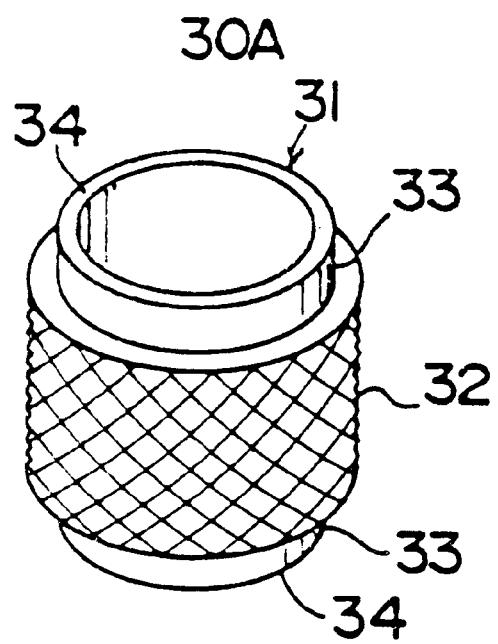
FIGS. 4(a) and 4(b) are some other embodiments of the collar according to the present invention.
Figure 4:
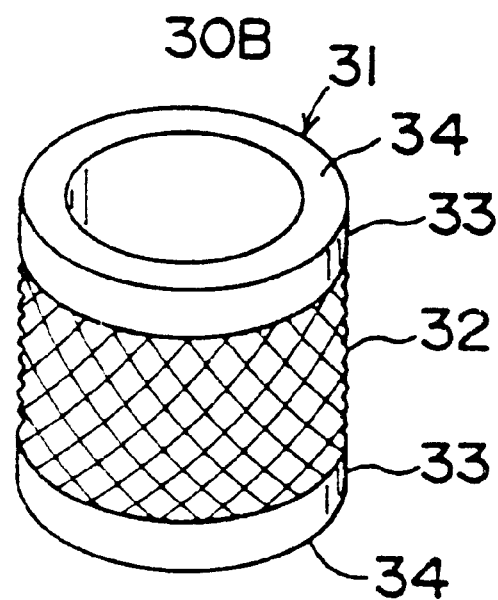

FIGS. 4(a) and 4(b) are perspective views showing some embodiments of the collar according to the present invention.

In a collar 30A shown in FIG. 4(a), non-knurled portions 33 are provided in both end portions of the collar 30A. In this collar 30A provided with the non-knurled portions 33 in both end portions, consideration on the directional property of the collar can be omitted at the time of embedding it in the stay body by insert molding. However, because of the lack of the directional property, the slight-chamfering must be performed on both end surfaces. On the other hand, since stepped portions exist between the portion to be knurled 32 and the portions not to be knurled 33 in the collar 30A before knurling, a rolling die with larger width can be used to obtain desired width of the knurled portion, without requiring a rolling die of a size corresponding to the width of the portion to be knurled, in the axial direction of the collar. Further, the waving due to plastic deformation of the material is generated at the stepped portions between the knurled portion 32 of the collar 30A and the non-knurled portions 33, without arriving at the end surfaces of the collar 30A. Accordingly, it is prevented that resin flows along the knurled grooves to leak to the seating surface 34 at the time of the insert molding for embedding the collar into the stay body.

In a collar 30B shown in FIG. 4(b), a knurled portion 32 is made by a rolling process to leave non-knurled portions 33 in both end portions, and slight-chamfering is not performed on the non-knurled portions 33. If waving is generated by the rolling process for the knurled portion 32, the waving is generated in the radial direction at the boundary between the knurled portion 32 and the non-knurled portion 33 of the collar 30B. Accordingly, also in this embodiment, it can be prevented of course that resin flows along the knurled grooves to leak to the seating surface 34, and a resin adhered portion of leaked resin is not formed on the seating surface 34. Thus, double measures are taken for preventing resin leakage, obtaining similar effects as in the above-described embodiments.

Figure 5:
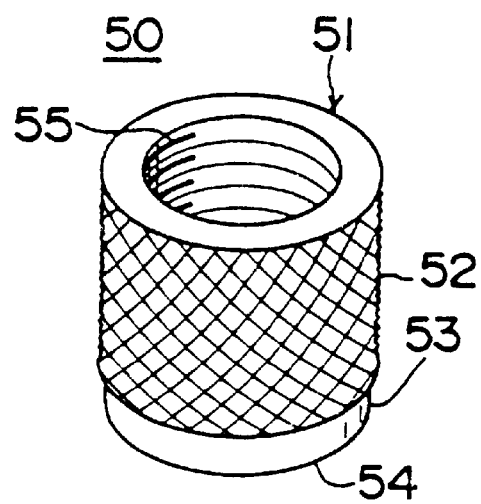
FIGS. 5(a) and 5(b) are views showing another embodiment of the fastener insert structure according to the present invention.
Figure 5:
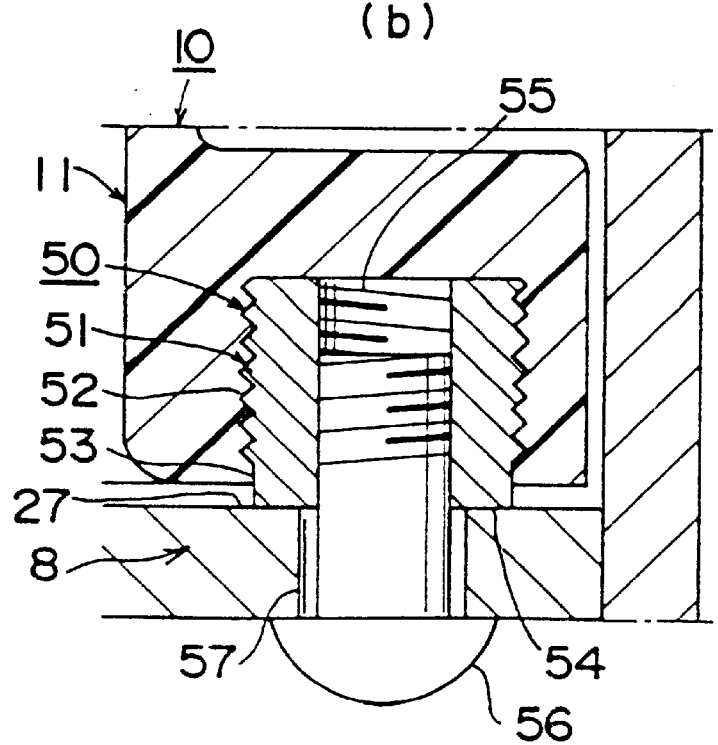

FIGS. 5(a) and 5(b) show another embodiment of the fastener insert structure according to the present invention.

In the present embodiment, a nut 50 as a fastener includes a nut body 51 formed as shown in FIG. 5(a) using material similar to the collar 30 in the above-described embodiment. Inside of the nut body 51, there is cut an internally threaded portion 55 into which a bolt 55 is screwed. Further, in an outer peripheral surface of the nut body 51, a knurled portion 52 and a non-knurled portion 53 are formed. As shown in FIG. 5(b), the non-knurled portion 53 and a seating surface 54 of the nut body 51 are positioned in the stay body 11 so as to slightly project from a lower surface of the stay body 11, and the other end surface of the nut body 51 is embedded in the stay 10 as an insert structure by insert molding.

The stay 10 having thus-embedded nuts by the insert molding is abutted against a fastening surface 27 of a bracket 8, and the internally threaded portions 55 of the nuts 50 are aligned to insertion holes 57 opened in the bracket 8. Then, bolts 56 are inserted from the lower side of the bracket 8 through the insertion holes and screwed into the internally threaded portion 55 of the nuts 50, respectively, and thereby, the stay 10 is fixed to the bracket 8. In the present embodiment also, it is possible to obtain effects similar to the above-described embodiments.

The present invention is not limited to the above embodiment, and can be variously changed without departing from the scope of the invention.

For example, a fastener is not limited to a collar and a nut through which a bolt is inserted to fasten, and such a fastener as a spacer for fastening with a bolt, a rivet, or the like may be used.

In the above-described embodiments, the description has been made referring to the case that a fastener insert structure is a stay, that is, the case that a brush holder unit of a motor to be mounted on a vehicle is fixed to a bracket of a motor housing. The present invention is not limited to this case, and can be generally applied to a fastener insert structure in which a cylinder-shaped fastener having knurled portion in its outer peripheral surface is embedded in a main body made of resin by the insert molding technique in such a manner that both end surfaces of the fastener are exposed from the main body, as in the case of insert molding of a screw member (nut) or collar in a mounting member for joining wiper arms.

As described above, according to the present invention, adhesion of resin onto a seating surface of a fastener can be prevented.

What is claimed is:

1. A fastening system comprising:

first and second structures to be fastened to one another, said first structure having a body of molded resin material having a first outer surface, a cylinder-shaped first fastener component embedded in said body of resin material as a result of having been molded in place relative to said body during the molding of said body, said first fastener component having a central axis generally normal to said first outer surface of said body and having an outer peripheral surface surrounding said central axis, said first fastener component having first and second end surfaces spaced from one another along and generally perpendicular to said central axis, said outer peripheral surface having a knurled portion embedded in said resin material of said body, said outer peripheral surface also including a non-knurled portion adjacent said first end surface of said fastener component, at least a part of which non-knurled portion of said peripheral surface is embedded in said resin material of said body with said one end surface of said first fastener element being exposed for direct engagement with a surface of said second structure, said non-knurled portion of said peripheral surface having a constant diameter and extending outwardly beyond said first outer surface of said body so that the first end surface of said first fastener component is spaced outwardly from said first outer surface of said body, and said first fastener component further having an opening extending inwardly from said first said end surface, said second structure having an outer surface engageable with said first end surface of said first fastener component of said first structure, and a second fastener component receivable in said opening of said first fastener component and cooperable with said first and second structures to hold said first and second structures fixed relative to one another with said first end surface of said first fastener component being in engagement with said outer surface of said second structure.

2. A fastening system as defined in claim 1, wherein said second end surface of said first fastening element is exposed relative to said body of said first structure, said opening in said first fastening component extends completely through said first fastening component from said first end surface to said second end surface, and said second fastening element extends through said opening in said first fastening component and has a head engageable with said second end surface of said first fastening component.

3. A fastening system as defined in claim 1, wherein:

said opening in said first fastening element is threaded, and said second fastening component is a screw threadably received by said opening in said first fastener component.

4. A fastening system as defined in claim 1, wherein:

both said first structure and said second structure are part of an electric motor, said second structure is a bracket of the motor, and said first structure includes a holder for a brush forming part of the motor.

* * * * *